(12) United States Patent
Hino (10) Patent No.: US 8,903,628 B2
(45) Date of Patent: Dec. 2, 2014

(54) DIAGNOSTIC METHOD AND DIAGNOSTIC SYSTEM FOR MULTICYLINDER INTERNAL COMBUSTION ENGINE

(75) Inventor: Seiji Hino, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 288 days.

(21) Appl. No.: 13/345,372

(22) Filed: Jan. 6, 2012

(65) Prior Publication Data

US 2012/0179355 A1 Jul. 12, 2012

(30) Foreign Application Priority Data

Jan. 11, 2011 (JP) ................................ 2011-003210

(51) Int. Cl.
| | | |
|---|---|---|
| *F02D 41/22* | (2006.01) | |
| *F02D 41/14* | (2006.01) | |
| *F02P 5/15* | (2006.01) | |
| *F02D 41/00* | (2006.01) | |
| *F02D 37/02* | (2006.01) | |
| *F02D 41/08* | (2006.01) | |

(52) U.S. Cl.
CPC ............ *F02D 41/1498* (2013.01); *F02D 37/02* (2013.01); *F02D 41/08* (2013.01); *F02P 5/1512* (2013.01); *F02D 41/1495* (2013.01); *Y02T 10/46* (2013.01)
USPC .......................................... 701/103; 123/436

(58) Field of Classification Search
CPC .......... F02D 41/0002; F02D 2041/001; F02D 2200/0406
USPC ........................................... 701/103; 123/436
See application file for complete search history.

(56) References Cited

U.S. PATENT DOCUMENTS

| | | | |
|---|---|---|---|
| 4,843,870 A * | 7/1989 | Citron et al. ................. | 73/114.15 |
| 5,069,183 A * | 12/1991 | Nagano et al. ............ | 123/406.22 |
| 5,226,390 A * | 7/1993 | Nakagawa ..................... | 123/436 |
| 5,440,921 A * | 8/1995 | Matsuno et al. ............ | 73/114.04 |
| 5,452,603 A * | 9/1995 | Asano et al. ................ | 73/114.67 |
| 5,670,715 A * | 9/1997 | Tomisawa ................... | 73/114.72 |
| 5,687,692 A | 11/1997 | Togai et al. | |
| 5,913,299 A * | 6/1999 | Shimizu et al. ............... | 123/436 |
| 6,237,327 B1 * | 5/2001 | Nishimura et al. ............. | 60/276 |
| 7,027,910 B1 * | 4/2006 | Javaherian et al. ........... | 701/111 |
| 7,117,727 B2 * | 10/2006 | Ohsaki et al. .............. | 73/114.04 |
| 7,762,232 B2 * | 7/2010 | Pursifull et al. .......... | 123/406.12 |
| 2005/0092303 A1 | 5/2005 | Oki | |
| 2007/0142998 A1 | 6/2007 | Nishie | |

(Continued)

FOREIGN PATENT DOCUMENTS

JP        07-279732 A      10/1995

*Primary Examiner* — Stephen K Cronin
*Assistant Examiner* — Joshua Campbell
(74) *Attorney, Agent, or Firm* — Gifford, Krass, Sprinkle, Anderson & Citkowski, P.C.

(57) ABSTRACT

A diagnostic method for a multicylinder internal combustion engine is provided. The method comprises determining that malfunction pertaining to the air-fuel ratio has occurred when degree of the rotational fluctuation is equal to or more than a first determination value; determining that malfunction pertaining to the air-fuel ratio has not occurred when the degree of the rotational fluctuation is equal to or less than a second determination value that is smaller than the first determination value; and changing mode of engine control when the degree of the rotational fluctuation is smaller than the first determination value and greater than the second determination value. After the changing, the determining that malfunction pertaining to the air-fuel ratio has occurred is repeated.

11 Claims, 5 Drawing Sheets

| DETERMINATION MODE | RESULT OF COMPARISON | VARYING STATUS OF IGNITION TIMING | DETERMINATION RESULT |
|---|---|---|---|
| I | J1≦VALUE | | DETERMINATION OF ABNORMALITY (PRESENCE OF ABNORMALITY) |
| II | VALUE≦J2 | TARGET IGNITION TIMING ≠ LIMIT TIMING | DETERMINATION OF NORMALITY (ABSENCE OF ABNORMALITY) |
| III | J2<VALUE<J1 | | SUSPENSION OF DETERMINATION (CHANGE TARGET IGNITION TIMING OF OTHER CYLINDER IN ADVANCING DIRECTION OF ANGLE) |
| IV | VALUE<J1 | TARGET IGNITION TIMING = LIMIT TIMING | DETERMINATION OF NORMALITY |

VALUE (INTEGRATEDΣΔT30/REFERENCE VALUE)

(56) References Cited

U.S. PATENT DOCUMENTS

| | | | |
|---|---|---|---|
| 2007/0163547 A1* | 7/2007 | Nakasaka | 123/478 |
| 2009/0211350 A1 | 8/2009 | Iwazaki et al. | |
| 2009/0319152 A1* | 12/2009 | Skala et al. | 701/101 |
| 2010/0168986 A1 | 7/2010 | Iwazaki et al. | |
| 2010/0242581 A1* | 9/2010 | Morikawa | 73/114.49 |

* cited by examiner

```
PROCEDURE FOR CALCULATING INTEGRATED VALUE
            ↓
   CALCULATE TIME PERIOD T30          — S10
            ↓
   CALCULATE DIFFERENCE IN TIME
   PERIOD T30 BETWEEN CYLINDERS 12    — S11
   AS ROTATIONAL FLUCTUATION ΔT30
            ↓
   CALCULATE INTEGRATED VALUE ΣΔT30   — S12
   OF ROTATIONAL FLUCTUATION ΔT30
            ↓
           END
```

Fig.4

| DETERMINATION MODE | RESULT OF COMPARISON | VARYING STATUS OF IGNITION TIMING | DETERMINATION RESULT |
|---|---|---|---|
| I | J1≦VALUE | | DETERMINATION OF ABNORMALITY (PRESENCE OF ABNORMALITY) |
| II | VALUE≦J2 | TARGET IGNITION TIMING ≠ LIMIT TIMING | DETERMINATION OF NORMALITY (ABSENCE OF ABNORMALITY) |
| III | J2<VALUE<J1 | | SUSPENSION OF DETERMINATION (CHANGE TARGET IGNITION TIMING OF OTHER CYLINDER IN ADVANCING DIRECTION OF ANGLE) |
| IV | VALUE<J1 | TARGET IGNITION TIMING = LIMIT TIMING | DETERMINATION OF NORMALITY |

VALUE (INTEGRATED ΣΔT30/REFERENCE VALUE)

Fig.6

DIAGNOSTIC METHOD AND DIAGNOSTIC SYSTEM FOR MULTICYLINDER INTERNAL COMBUSTION ENGINE

CROSS-REFERENCE TO RELATED APPLICATIONS

This application claims priority to Japanese Patent Application No. 2011-003210 filed on Jan. 11, 2011, which is incorporated herein by reference in its entirety including the specification, drawings and abstract.

BACKGROUND OF THE INVENTION

The present invention relates to a diagnostic method and a diagnostic system for a multicylinder internal combustion engine that determines the occurrence of a malfunction pertaining to an air-fuel ratio in a cylinder based on rotational fluctuations in the engine during lean-burn operation.

Recently, in a given operating area of an internal combustion engine using gasoline fuel, for example, in an idle operation state, it has been proposed that engine operation concerning the air-fuel ratio be leaner than the stoichiometric air-flow ratio, i.e., lean-burn operation is conducted to increase gas mileage of the engine. The lean-burn operation is achieved by stratified charge combustion, for example, by directly injecting fuel into cylinders at the latter period of a compression stroke.

For the purpose of preventing environmental damage such as air pollution, an OBD (on-board diagnostic) system that detects or determines, and displays deterioration and/or failure of car parts for controlling exhaust gas has been introduced. The OBD system detects or determines malfunction of car parts for controlling exhaust gas, displays a warning to inform a driver of a malfunction when it occurs and stores a failure record thereof.

Especially, an apparatus has been developed for determining the occurrence of variation in air-fuel ratios among cylinders that is at a predetermined level or greater, in a multicylinder internal combustion engine. For example, see Japanese Laid-open Patent Publication No. 7-279732. In the apparatus of JP No. 7-279732A, rotational fluctuation of an output shaft of an internal combustion engine between the cylinders is detected during the lean-burn operation, and occurrence of the variation in air-fuel ratios is determined based on the detected rotational fluctuation. For example, rotational speed of the output shaft of the engine is detected per cylinder at a predetermined rotational angular range in a combustion stroke (for example, a period from a top dead center for compression to the time when the output shaft of the engine rotates by 30°), and the difference of the detected rotational speeds between the cylinders is used as the rotational fluctuation.

During the lean-burn operation of the internal combustion engine, the amount of fuel provided for combustion in the cylinders is small. Thus, misfires tend to occur when the air-fuel ratio is unnecessarily changed due to individual difference in the engine or variation with time. Therefore, the acceptable range of variation in the air-fuel ratio for operation of the engine is quite narrow. Thus, in an apparatus that determines occurrence of variation in air-fuel ratio through the comparison between the rotational fluctuations and a determination value, a scope of values the rotational fluctuation, which is a parameter for determining the occurrence of variation in air-fuel ratio, can take is also quite narrow. Then, a value that divides such a narrow scope into two areas, one being an area where the variations of air-fuel ratio occurs and another being an area where the variations of air-fuel ratio does not occur, which needs to be set as the determination value. When the determination of occurrence of the variations of air-fuel ratio is performed based on the determination value set for the narrow scope, accuracy of the determination is hard to improve. In this regard, there is room for improvement in the malfunction determination apparatus as described above.

An object of the present invention is to provide a diagnostic method and a diagnostic system for a multicylinder internal combustion engine that can determine occurrence of the malfunction pertaining to an air-fuel ratio with excellent accuracy.

SUMMARY OF THE INVENTION

In one aspect of the invention, a diagnostic method for a multicylinder internal combustion engine for detecting a rotational fluctuation between cylinders during lean-burn operation of the engine and determining occurrence of malfunction pertaining to air-fuel ratio in a given cylinder based on the detected rotational fluctuation is provided. The method comprises determining that malfunction pertaining to the air-fuel ratio has occurred when degree of the rotational fluctuation is equal to or more than a first determination value; determining that malfunction pertaining to the air-fuel ratio has not occurred when the degree of the rotational fluctuation is equal to or less than a second determination value that is smaller than the first determination value; and changing mode of engine control when the degree of the rotational fluctuation is smaller than the first determination value and greater than the second determination value, so that: the difference between torque generated in the given cylinder and torque generated in another cylinder becomes greater, the control for the given cylinder and that for the another cylinder are different, and the torques are increased, wherein, after the changing, repeating the determining that malfunction pertaining to the air-fuel ratio has occurred.

In second aspect of the invention, a diagnostic system for a multicylinder internal combustion engine for detecting a rotational fluctuation between cylinders during lean-burn operation of the engine and determining occurrence of malfunction pertaining to an air-fuel ratio in a given cylinder based on the detected rotational fluctuation is provided. The diagnostic system comprises an electronic control unit including a CPU and memory having stored therein procedure steps executed by the CPU. The steps comprises when degree of the rotational fluctuation is equal to or more than a first determination value, determining that malfunction pertaining to the air-fuel ratio has occurred; when the degree of the rotational fluctuation is equal to or less than a second determination value that is smaller than the first determination value, determining that malfunction pertaining to the air-fuel ratio has not occurred; and when the degree of the rotational fluctuation is smaller than the first determination value and greater than the second determination value, changing mode of engine control so that: the difference between torque generated in the given cylinder and torque generated in another cylinder becomes greater, the control for the given cylinder and that for the another cylinder are different, and the torques are increased, wherein the determining that malfunction pertaining to the air-fuel ratio has occurred is repeated.

As used herein, the configuration that changes a mode of engine control so that engine control for a given cylinder (also referred to as a first cylinder) and engine control for another cylinder (also referred to as other cylinder(s) or a second cylinder) are different encompasses the configuration that changes both engine control for a given cylinder and engine control for the other cylinder(s) as well as the configuration that changes either engine control for a given cylinder or engine control for the other cylinder(s).

DETAILED DESCRIPTION OF THE PREFERRED EMBODIMENTS

A malfunction determination apparatus according to an embodiment of the invention that is applied to an in-line 4-cylinder internal combustion engine will be described.

Figure 1:
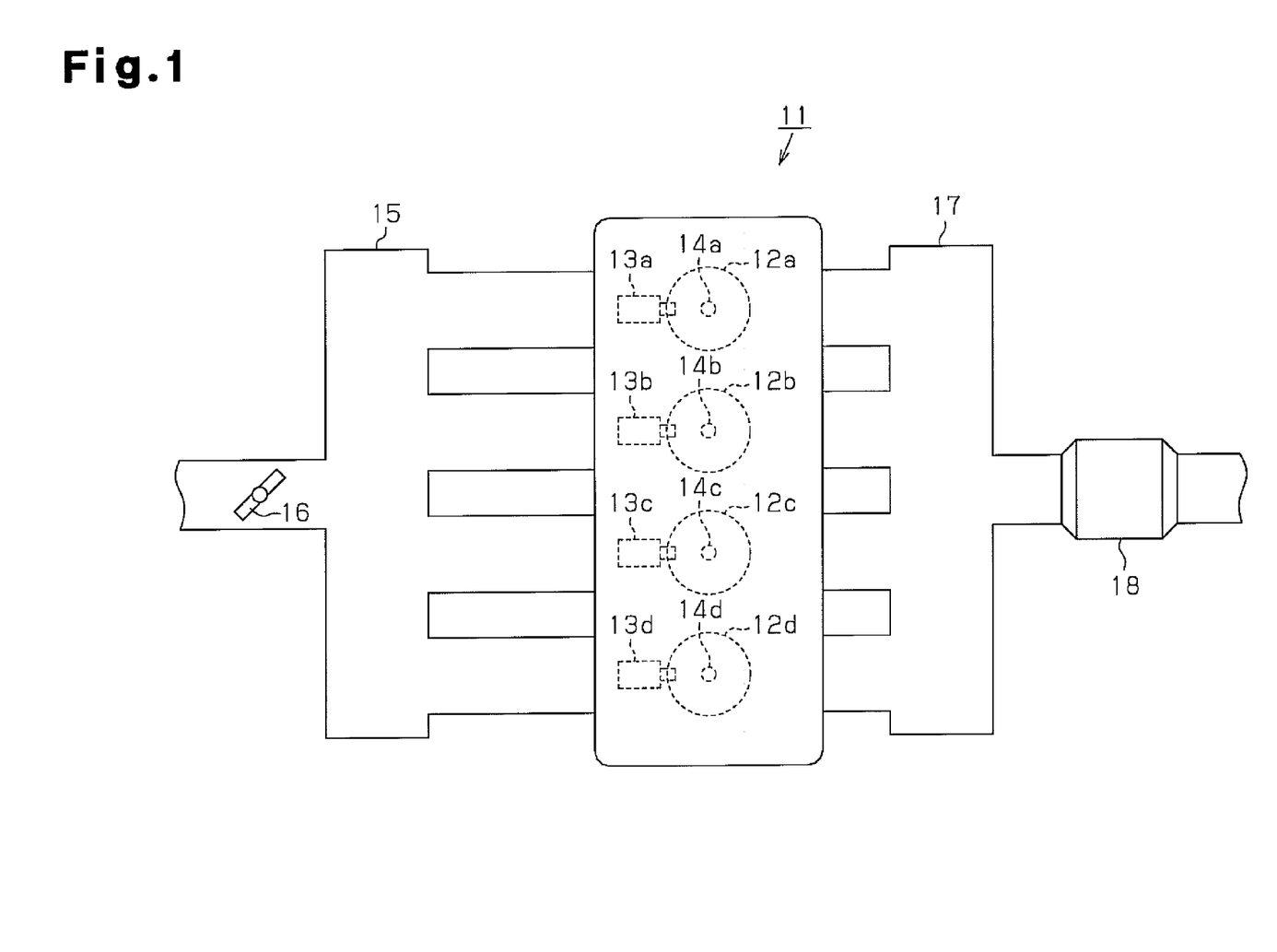
FIG. 1 is a schematic diagram illustrating a simplified configuration of internal combustion engine to which a malfunction determination apparatus according to an embodiment of the present invention is applied.

As illustrated in FIG. 1, in an internal combustion engine 11, injectors 13a, 13b, 13c and 13d and ignition plugs 14a, 14b, 14c and 14d are attached to the respective cylinders 12a, 12b, 12c and 12d. The injectors 13a, 13b, 13c and 13d inject fuel directly into the cylinders 12a, 12b, 12c and 12d, respectively. In the following, unless the number is specified or when the element is referred to collectively, the cylinder(s), the injector(s) and the ignition plug(s) are denoted simply as "cylinder 12", "injector 13", and "ignition plug 14".

Air is drawn into each cylinder 12a-12d of the internal combustion engine 11 via an intake passage 15. A throttle valve 16 is attached to the merged portion of the intake passage 15. Combustion gas in each cylinder 12a-12d of the engine 11 is exhausted to the exhaust passage 17. A purifying apparatus 18 is attached at the merged portion of the exhaust passage 17.

In the above engine 11, an opening degree of the throttle valve 16 is controlled to adjust the flow passage of the intake passage 15 thereby controlling the amount of air drawn into each cylinder 12a-12d. Through controlling operation of the ignition plugs 14a-14d, ignition timing for an air-fuel mixture consisting of air drawn into each cylinder 12a-12d and injection fuel. Exhaust gas from each cylinder 12a-12d of the engine 11 is purified at the purifying apparatus 18 and expelled out of the exhaust passage 17.

The combustion cycle for each cylinder 12a-12d of the internal combustion engine 11 consists of four steps: an intake stroke, a compression stroke, an expansion stroke, and an exhaust stroke in one cycle. Fuel injection and ignition in the cylinders 12a-12d of the engine 11 are conducted basically in the order of the first cylinder 12a, the third cylinder 12c, the fourth cylinder 12d, and the second cylinder 12b with a phase difference of 180 degree (° CA) in the rotation angle of the output shaft 19 (see FIG. 2) of the engine 11. In other words, when the output shaft 19 of the engine 11 rotates by 720° CA, the four strokes are conducted one time in all the cylinders 12.

Figure 2:
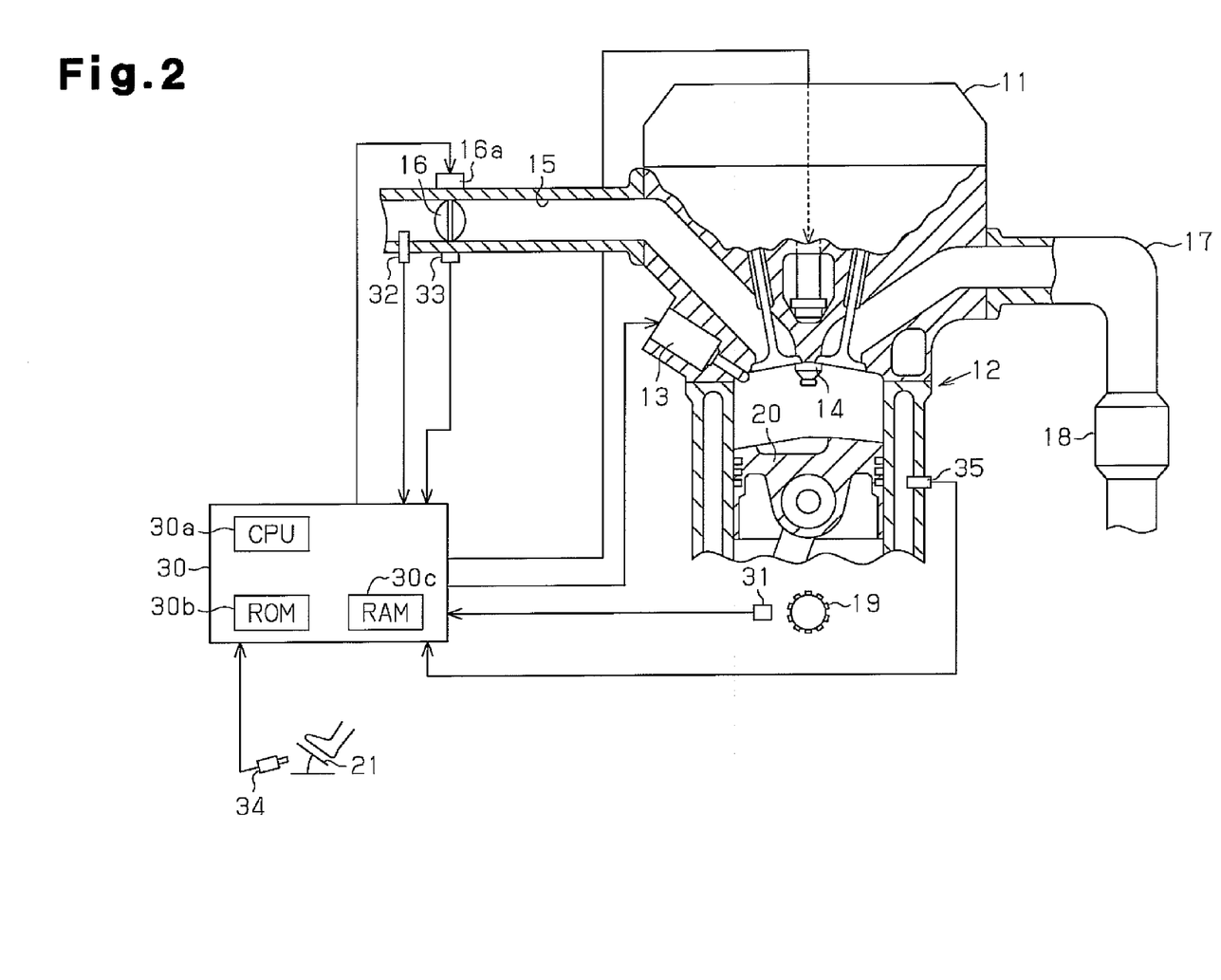
FIG. 2 is a schematic diagram illustrating detailed structure of the internal combustion engine.

Next, detailed structure of the internal combustion engine 11 will be described.

As illustrated in FIG. 2, a piston 20 is provided in each cylinder 12 of the internal combustion engine 11 to reciprocally move in the cylinder 12. A rotation sensor 31 is provided near the output shaft 19 to detect rotational angle or rotational speed (engine rotational speed) of the output shaft 19). In the internal combustion engine 11, the piston 20 reciprocally moves in the cylinder at the combustion cycle as described above, and the output shaft 19 accordingly rotates via a connecting rod in association with the reciprocal movement.

Operation of the internal combustion engine 11 is controlled by an electronic control unit 30. The electronic control unit 30 includes a CPU 30a that executes various operations for controlling the operation of the internal combustion engine 11 (including steps for malfunction determination as illustrated in FIGS. 3 to 6), a ROM 30b for storing programs or data for the control, and a RAM 30c that temporarily stores results of calculation by the CPU 30a. The electronic control unit 30 also receives output signals from various sensors such as the rotation sensor 31. The various sensors include, for example, an intake air amount sensor 32 for detecting the amount of intake air of the intake internal combustion engine 11, a throttle sensor 33 for detecting an opening degree (opening amount) of the throttle valve 16, an accelerator sensor 34 for detecting a depression amount of an accelerator pedal 21, a temperature sensor 35 for detecting the temperature of engine cooling water, etc. The electronic control unit 30 executes various calculations based on the output signals from the various sensors, and performs various controls such as control of the injector 13 (fuel injection control); control of the throttle valve 16, more particularly, control of a throttle motor 16a (throttle controller), and control of the ignition plug 14 (ignition timing control); based on the calculation results.

The fuel injection control according to the present embodiment is performed as follows. First, based on the depression amount of the accelerator pedal 21 and engine rotation speed, a control target value for the fuel injection amount, i.e., a target injection amount is calculated. Then, based on the target injection amount and the engine rotation speed, a control target value for the fuel injection timing, i.e., target injection timing, and a control target value for fuel injection period, i.e., a target injection period, is calculated. Then, based on the target injection timing and the target injection period, operation of each injector 13a-13d is controlled.

The throttle control according to the present embodiment is performed as follows. Based on the target injection amount and the engine rotation speed, a control target value for the throttle opening amount, i.e., a target throttle opening amount, is calculated. Then, operation of the throttle motor 16a is controlled so that an actual throttle opening amount matches with the target throttle opening amount.

The ignition timing control according to the present embodiment is performed as follows. Based on the target injection amount and the engine rotation speed, a control target value for the ignition timing, i.e., target ignition timing, is calculated. The operation of each ignition plug 14a-14d is controlled so that ignition is conducted at the calculated target ignition timing. In the present embodiment, the target ignition timing can be set for each cylinder 12 of the internal combustion engine 11 and operation of the ignition plug 14 can be controlled based on the target ignition timing.

In the operation control of the internal combustion engine 11 according to the present embodiment, combustion of the air-fuel mixture in the cylinder 12 is switched between combustion at a stoichiometric air-flow ratio and lean combustion, based on the operating state of the engine 11. In the combustion at the stoichiometric air-flow ratio, a uniform air-fuel mixture in which fuel is uniformly mixed with air is burned at the stoichiometric air-flow ratio. In the lean combustion, the air-fuel mixture is burned on the condition leaner than the stoichiometric air-flow ratio.

For lean combustion, "stratified combustion" is used. In the stratified combustion, fuel injection from the injector 13 is conducted during the compression stroke to form a stratified air-fuel mixture where a burnable air-fuel mixture exists only around the ignition plug 14. Then, the stratified air-fuel mixture is burned. In the present embodiment, the lean combustion is conducted at the idle state of the internal combustion engine 11.

In the present embodiment, the electronic control unit 30 performs a process of malfunction determination for determining if there is an occurrence of malfunction that an air-fuel ratio of the air-fuel mixture in either of the cylinder 12 becomes overly lean. First, during an idle operation (lean-burn operation) of the internal combustion engine 11, a rotational fluctuation $\Delta T30$ between the cylinders 12a-12d is detected and its integrated value $\Sigma\Delta T30$ is calculated.

A procedure for calculating the integrated value $\Sigma\Delta T30$ will be described in detail with reference to FIG. 3. It should be understood that the integrated value $\Sigma\Delta T30$ is calculated for each of the cylinders 12a-12d.

Figure 3:
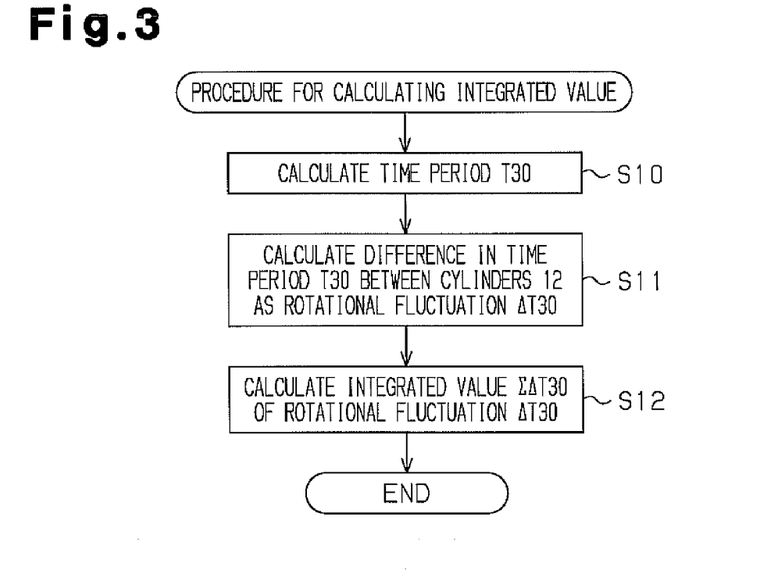
FIG. 3 is a flowchart illustrating a procedure for calculating an integrated value.

As illustrated in FIG. 3, based on the detection result from the rotation sensor 31, rotational speed of the output shaft 19 is detected at a predetermined rotation angle during the combustion stroke (step S10). In particular, by setting a top dead center on the compression stroke as a reference point "0° CA", the time period T30 required for the output shaft 19 to rotate from 0° CA to 30° CA is calculated. The time period T30 is calculated as the time period required for rotating by 30° CA when the rotational speed of the output shaft 19 is maximum.

Then, the difference in the time periods T30 between the cylinders 12 is calculated as the rotational fluctuation $\Delta T30$ (step S11). The rotational fluctuation $\Delta T30$ is defined as the difference between the time period T30[$i$] for the cylinder 12 and the time period T30[$i-1$] for the cylinder 12[$i-1$], which was ignited immediately before the cylinder 12[$i$] in the ignition process. In other words, the rotational fluctuation $\Delta T30$[$i$] is a value that satisfies the expression:

$$\Delta T30[i]=T30[i]-T30[i-1]$$

The greater value means that more time is required for the current ignition cylinder 12[$i$] to rotate by 30° CA than the previous ignition cylinder 12[$i-1$]. It is highly possible that the torque generated due to combustion of the current ignition cylinder 12[$i$] is smaller than that of the previous ignition cylinder 12[$i-1$], and that the air-fuel ratio is lean.

Then, by adding the rotational fluctuation $\Delta T30$ calculated in step 11, to the integrated value $\Sigma\Delta T30$, the integrated value $\Sigma\Delta T30$ of the rotational fluctuations $\Delta T30$ is calculated (step S12).

In the malfunction determination according to the present embodiment, when the integration of the rotational fluctuations $\Delta T30$ by the amount the output shaft 19 rotates the predetermined number (200 times in this embodiment) is finished, presence of a malfunction pertaining to an air-fuel ratio in the given cylinder is determined based on the integrated value $\Sigma\Delta T30$. The given cylinder corresponds to the cylinder 12[$i$] when the rotational fluctuation used for calculating the integrated value $\Sigma\Delta T30$ is set as the rotational fluctuation $\Delta T30$[$i$].

In the present embodiment, basically, when the integrated value $\Sigma\Delta T30$ is great, it is judged that the air-fuel ratio of the given cylinder is below a predetermined level and leaner than the air-fuel ratio of the other cylinders. Thus, it is determined that malfunction pertaining to the air-fuel ratio occurs (lean malfunction). On the other hand, when the integrated value $\Sigma\Delta T30$ is small, it is judged that there are smaller or no variations between the cylinders 12. Thus, it is determined that lean malfunction does not occur.

The amount of fuel supplied for combustion in the cylinder 12 is small at the time of lean-burn operation of the internal combustion engine 11. Especially, it is very small during the idle operation. In the present embodiment, lean combustion is selected during the idle operation of the engine 11. Thus, during the idle operation of the engine 11, misfires tend to occur when the air-fuel ratio is unnecessarily changed due to individual difference in the engine or variation with time. Therefore, the acceptable range of variation in the air-fuel ratio for operation of the engine is quite narrow. In the present embodiment, on the condition that the internal combustion engine 11 is in the idle operation, occurrence of lean malfunction is determined through the malfunction determination procedure. Since the range of the value the rotational fluctuation $\Delta T30$ (more particularly, its integrated value $\Sigma\Delta T30$) can take as a determination parameter is very narrow, to divide such range into two regions, i.e., a region where lean malfunction occurs and a region where lean malfunction does not occur, is difficult. Thus, improvement of the determination accuracy is difficult.

In light of the above, in the present embodiment, determination of occurrence of lean malfunction based on the integrated value $\Sigma\Delta 30$ of the rotational fluctuation $\Delta T30$ is performed as follows. Specifically, in addition to the two determinations of the determination of presence of lean malfunction ("Determination mode I" described below) and the determination of absence of lean malfunction ("Determination mode II" described below), determination for suspending the determination of presence or absence of lean malfunction ("Determination mode III" described below) is set. Then, when a determination of the malfunction determination procedure becomes the Determination mode III, the ignition timing control is changed so that the difference between the torque generated in the given cylinder and the torques generated in the other cylinders becomes greater, and calculation of the integrated value $\Sigma\Delta T30$ and determination of occurrence of lean malfunction based on the integrated value $\Sigma\Delta T30$ are performed again. As used herein, other cylinder(s) refer to all the cylinder(s) other than the given cylinder. In the present embodiment, the other cylinders are three cylinders 12.

The detailed steps of the malfunction determination procedure and the operations brought by the procedure will be explained.

First, in the procedure for malfunction determination according to the present embodiment, a reference value of the integrated value $\Sigma\Delta T30$ is calculated based on an engine load and engine rotation speed. The value $\Sigma\Delta T30$/the reference value is then obtained by dividing the integrated value $\Sigma\Delta T30$ by the reference value. As the engine load, for example, a value calculated by dividing the target injection amount by the engine rotation speed is used.

As the reference value, a value that corresponds to the integrated value $\Sigma\Delta 30$ calculated in the engine operation region defined by the engine load and the engine rotation speed. The reference value is set so great as to reliably determine the occurrence of lean malfunction in the engine operation region. Accordingly, when the above value of the $\Sigma\Delta T30$/reference value is 1.0 or greater, occurrence of lean malfunction can be reliably determined. When the value of the $\Sigma\Delta T30$/reference value is less than 1.0, it is determined that the possibility of occurrence of lean malfunction is lower.

In the present embodiment, the value $\Sigma\Delta30$/reference value serves as degree of rotational fluctuation.

In the present embodiment, as comparative values to the above value $\Sigma\Delta30$/reference value, a first determination value J1 (specifically, "1.0") and a second determination value J2 that is smaller than the first determination value J1 (for example, "0.9") are set in advance. As such, the first determination value J1 and the second determination value J2 are both positive and constant. The value of the second determination value J2 is set to the value that enables the determination that the value $\Sigma\Delta30$/reference value is small enough to reliably determine the absence of lean malfunction.

Figure 4:
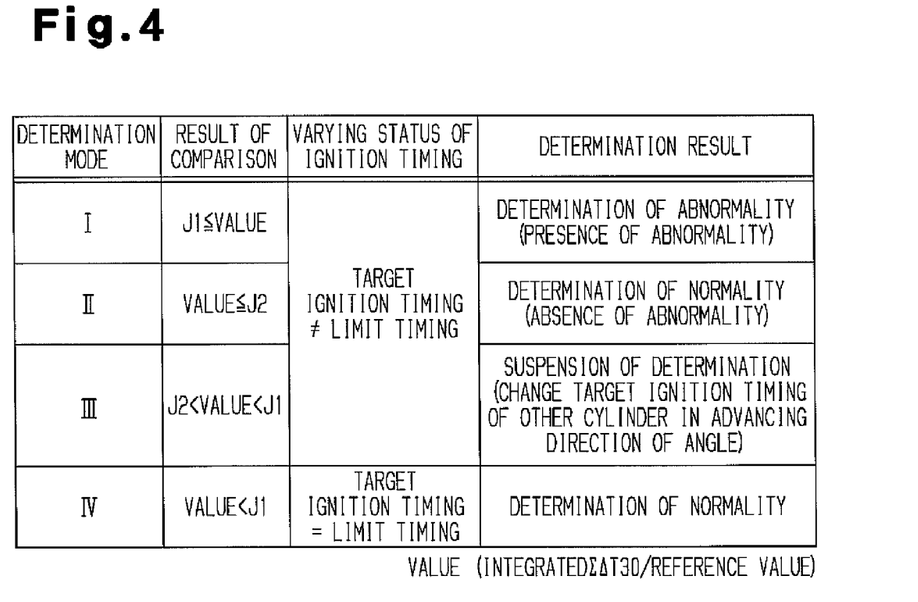
FIG. 4 is a table representing each determination in the determinations of lean malfunction.

Then, as illustrated in FIG. 4, based on the comparison between the determination values J1, J2 and the value $\Sigma\Delta T30$/reference value, presence or absence of lean malfunction is determined in either of the Determination modes I through IV as described below.

Determination Mode I

When the value $\Sigma\Delta30$/reference value is equal to or greater than the first determination value J1, it is determined that a lean malfunction occurs. More specifically, in this case, the integrated value $\Sigma\Delta30$ is great and the torque generated in the given cylinder is smaller than the torque generated in the other cylinders. It is highly possible that this is the cause of lean malfunction pertaining to the air-fuel ratio in the given cylinder. Accordingly, it is determined that a lean malfunction has occurred in the given cylinder.

Determination Mode II

When the value $\Sigma\Delta30$/reference value is equal to or smaller than the second determination value J2, it is determined that a lean malfunction has not occurred. In this case, the integrated value $\Sigma\Delta30$ is small and the difference between the torque generated in the given cylinder and the torque generated in the other cylinders is small. Thus, the value of the torque generated in the given cylinder is normal. Accordingly, it is determined that a lean malfunction has not occurred in the given cylinder.

Determination Mode III

When the value $\Sigma\Delta T30$/reference value is less than the first determination value J1 and greater than the second determination value J2, the presence or absence of lean malfunction is not determined, and the determination is held. That is, it is determined that the integrated value $\Sigma\Delta T30$ of the rotational fluctuations $\Delta T30$ is not so great as to reliably determine occurrence of lean malfunction in the given cylinder as well as not so small as to reliably determine the absence of lean malfunction.

However, in this case, the ignition timing control is changed to increase the torque generated in the internal combustion engine 11 and to increase the integrated value $\Sigma\Delta30$. More specifically, the target ignition timings of the other cylinders (i.e., three cylinders other than the given cylinder) are varied by a predetermined value $\alpha$ (for example, several ° CA) in the advancing direction of angle whereas the target ignition timing of the given cylinder remains unchanged. Thus, since the torque generated in the given cylinder does not change by not changing the ignition timing of the given cylinder while the torques generated in the other cylinders are increased by changing the ignition timings of the other cylinders in the advancing direction of the angle, the difference between the torque generated in the given cylinder and the torque generated in each of the other cylinders becomes greater. In other words, the ignition timing control is changed in a manner that the integrated value $\Sigma\Delta T30$, that becomes great due to occurrence of lean malfunction in the given cylinder, becomes much greater. Moreover, since the ignition timing is changed to increase the torques generated in the other cylinders, occurrence of misfires is prevented. When the engine rotation speed is increased in accordance with the increase in the torques generated in the other cylinders, the rotational fluctuations between the other cylinders becomes smaller. Thus, vibration of the internal combustion engine 11 is suppressed.

In the present embodiment, each time the mode of the malfunction determination procedure becomes the Determination mode III, the target ignition timings of the other cylinders are changed by a predetermined angle in the advancing direction of angle. In this regard, MBT is set as the limit timing for the change. MBT is the ignition timing where the torque generated becomes maximum in the corresponding engine control region. By setting such limit timing, in changing the target ignition timings of the other cylinders in the advancing direction of the angle, changes in the target ignition timings further in the advancing direction of the angle is prohibited or prevented when the target ignition timing becomes the MBT at which the generated torque does not become greater even if the ignition timing is advanced further. Accordingly, each ignition timing can be varied during the scope where the generated torques is increased.

In the case where determination mode becomes Determination mode III, after the ignition timing control is changed as described above, the integrated value $\Sigma\Delta30$ of the rotational fluctuation $\Delta T30$ is calculated again, and the determination of occurrence of lean malfunction based on the calculated integrated value $\Sigma\Delta30$ is performed again.

Determination Mode IV

When the value $\Sigma\Delta T30$/reference value, which is calculated on the condition that the target ignition timings of the other cylinders become MBT through the change in the ignition timing control, becomes less than the first determination value J1, it is determined that lean malfunction does not occur. In other words, even if the ignition timing is changed to increase the rotational fluctuation $\Delta T30$, the value of $\Sigma\Delta T30$/reference value is maintained smaller than to the first determination value J1 even after the target ignition timings of the other cylinders reach MBT. In this case, it is determined that the rotational fluctuation $\Delta T30$ is small and that a lean malfunction has not occurred. Thus, in the present embodiment, when the target ignition timings of the other cylinders have reached MBT through the change in the ignition timing control, occurrence of lean malfunction is determined based on the comparison between the value of the $\Sigma\Delta T30$/reference value calculated again on such condition and the first determination value J1. If the value of the $\Sigma\Delta T30$/reference value is equal to or greater than the first determination value J1, it is determined that lean malfunction occurs (the above Determination mode I).

As seen above, in the malfunction determination procedure according to the present embodiment, when the integrated value $\Sigma\Delta T30$ of the rotational fluctuation $\Delta T30$ is so great that it is highly possible that lean malfunction occurs, presence of lean malfunction is steadily determined without changing the mode of engine control (Determination mode I). When the integrated value $\Sigma\Delta T30$ of the rotational fluctuation $\Delta T30$ is so small that that it is highly possible that lean malfunction does not occur, absence of lean malfunction is steadily determined without changing the mode of engine control (Determination mode II). When the integrated value $\Sigma\Delta T30$ of the rotational fluctuation $\Delta T30$ is not so great but not so small, the mode of the ignition timing control is changed so that the range the integrated value $\Sigma\Delta T30$ can take becomes greater (Determination mode III), and then the re-calculation of the integrated value $\Sigma\Delta T30$ and the determination based on the re-calculated integrated value $\Sigma\Delta T30$ can be performed (Determination mode I-Determination mode IV). Thus, occurrence of a lean malfunction can be determined based on the integrated value $\Sigma\Delta30$ of the rotational fluctuation $\Delta T30$ that changes over a relatively broad range, and the determination can be performed with high accuracy. Accordingly, according to the malfunction determination procedure of the present embodiment, occurrence of a lean malfunction can be determined with high accuracy.

Figure 5:
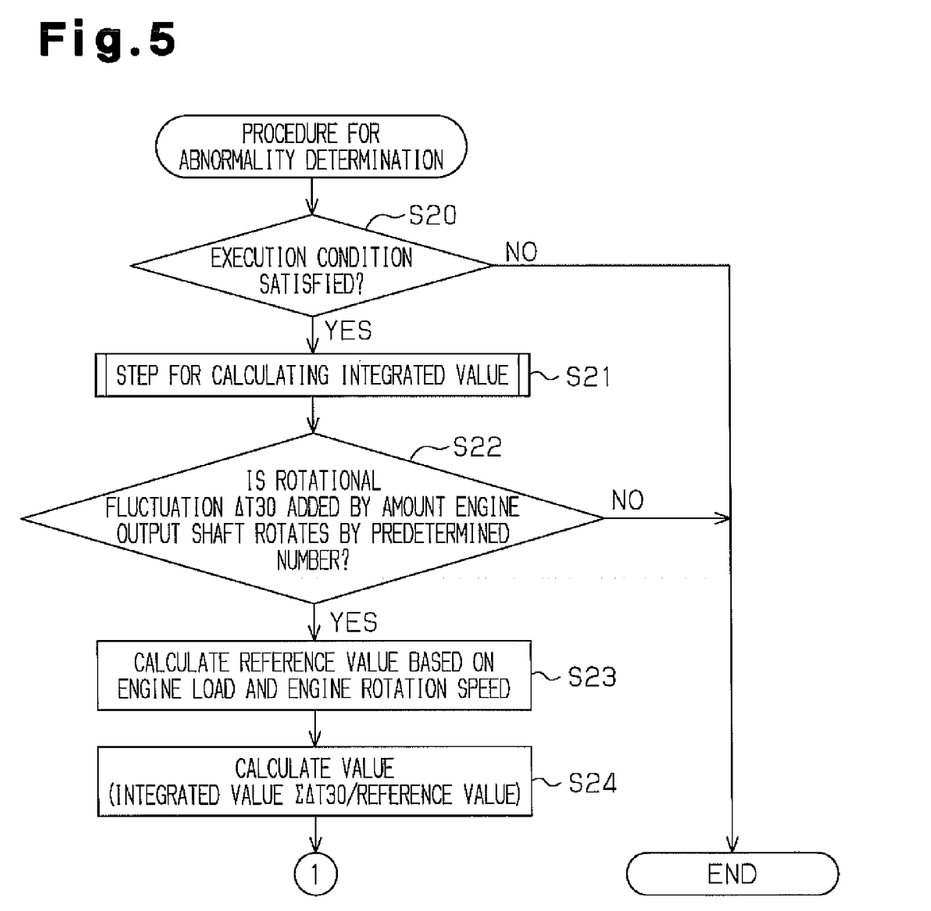
FIG. 5 is a flowchart illustrating a procedure for performing a malfunction determination.
Figure 6:
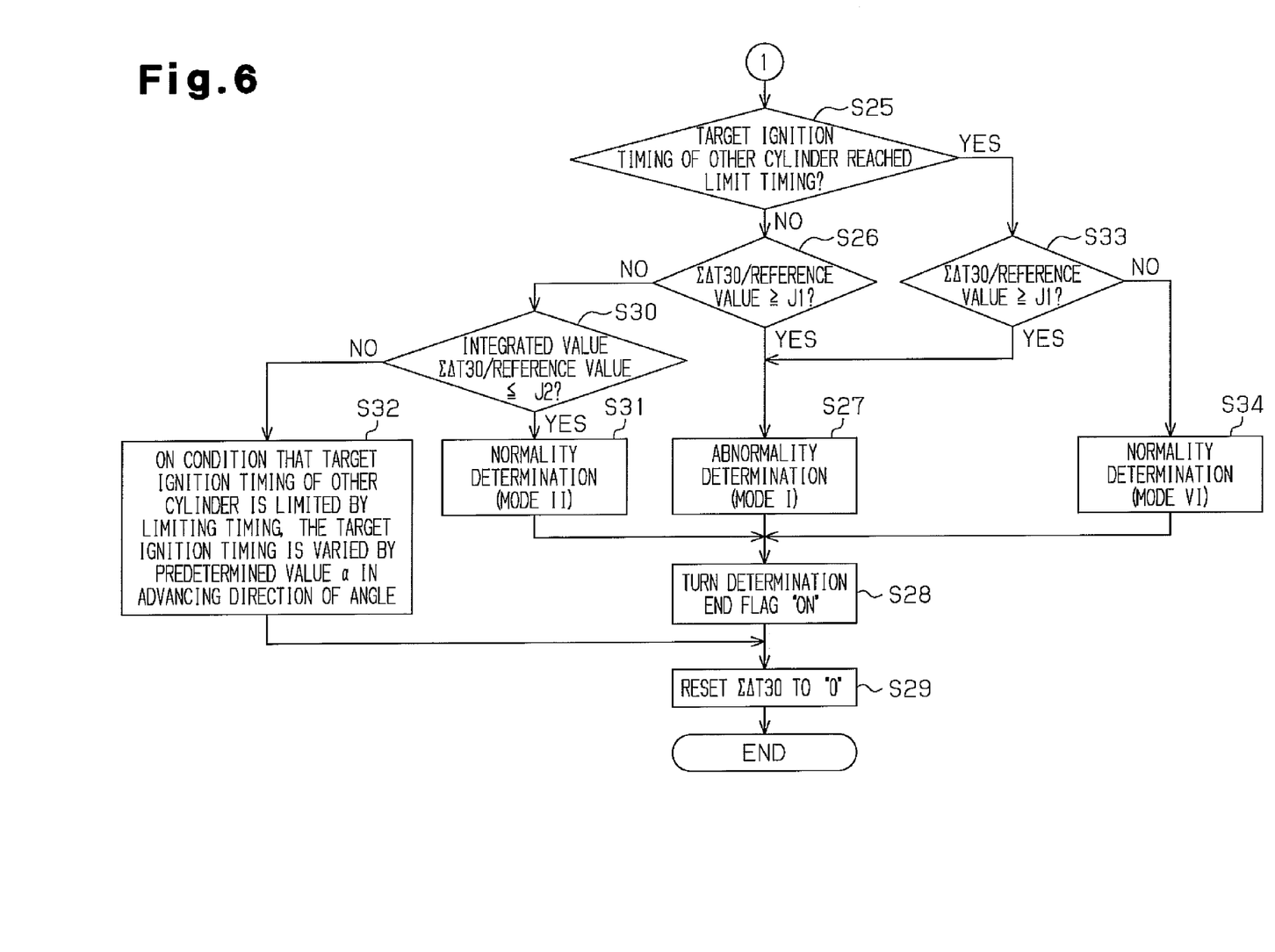
FIG. 6 is a flowchart illustrating a procedure for performing a malfunction determination.

The detailed steps of the malfunction determination procedure according to the present embodiment will be described with reference to the flowcharts of FIGS. 5 and 6. A series of steps as illustrated in FIGS. 5 and 6 are performed by the electronic control unit 30 as interrupt processing in every predetermined cycle. In addition, the series of steps are performed for each cylinder 12a-12d.

As illustrated in FIG. 5, in this procedure, first, whether an execution condition is satisfied or not is determined (step 20). Here, it is determined that the execution condition is satisfied by satisfying all the following conditions:

the internal combustion engine 11 is in the idle operation (specifically, an accelerator pedal 21 is not operated and the engine is in a stable condition where the variations in the engine rotation speed is small.

Warmed-up of the internal combustion engine 11 is finished (Specifically, the temperature of cooling water in the engine is the predetermined value or more).

A determination end flag is off.

If the execution condition is not satisfied (step S20: NO), the processing ends without the subsequent steps. The determination end flag is turned off when the ignition switch is turned on to start engine operation and the determination end flag is turned on when the presence or absence of a lean malfunction is determined. In the present embodiment, occurrence of lean malfunction is determined once per trip, i.e., on the condition that the determination end flag is off.

Then, if the procedures are repeated to satisfy the execution condition (step S20: YES), the processing for calculating the integrated value $\Sigma\Delta T30$ of the rotational fluctuation $\Delta T30$ (see FIG. 3) is repeated (step S21) until the rotational fluctuation $\Delta T30$ is calculated and added so that the output shaft 19 of the internal combustion engine 11 rotates by the predetermined number (step S22: NO).

If the integrated value $\Sigma\Delta T30$ to which the rotational fluctuation $\Delta T30$ is added so that the output shaft 19 of the internal combustion engine 11 rotates by the predetermined number is calculated (step S22: YES), the reference value is calculated based on the engine load and the engine rotation speed (step S23). In the present embodiment, the relation between the engine operation region, which is defined by the engine load and the engine rotation speed, and the reference value appropriate for determining the occurrence of lean malfunction is determined experimentally or based on the results of simulation and stored in the electronic control unit 30. In the step S23, the reference value is calculated based on such relation. Specifically, the greater the engine load and the lower the engine rotational speed, the greater the reference value.

Then, the $\Sigma\Delta T30$/reference value is calculated by dividing the rotational fluctuation $\Delta T30$ by the reference value (step S24).

As illustrated in FIG. 6, it is determined if the target ignition timings of cylinders other than the given cylinder (i.e., the other cylinders) have reached MBT (step S25).

If the target ignition timings of the other cylinders have not reached MBT (step S25: NO), occurrence of a lean malfunction in the given cylinder is determined based on the comparison between the first determination value J1 or the second determination value J2 and the value $\Sigma\Delta30$/reference value.

If the value $\Sigma\Delta30$/reference value is equal to or greater than the first determination value J1 (step S26: YES), the presence of a lean malfunction is determined in the Determination mode I (step S27). Then, the determination end flag is turned on (step S28), the integrated value $\Sigma\Delta30$ is reset to "0" (step S29), and the procedure ends. In the present embodiment, if the presence of a lean malfunction is determined affirmatively, a warning lamp is illuminated and a record of occurrence of a lean malfunction is stored in the electronic control unit 30.

Meanwhile, if the value $\Sigma\Delta T30$/reference value is equal to or less than the second determination value J2 (step S26: NO and step S30: YES), the absence of a lean malfunction is determined in the Determination mode II (step S31). In this case, again, the determination end flag is turned on (step S28), the integrated value $\Sigma\Delta30$ is reset to "0" (step S29), and the procedure ends.

On the other hand, if the value $\Sigma\Delta30$/reference value is smaller than the first determination value J1 but greater than the second determination value J2 (step S26: NO and step S30: NO), in the Determination mode III, on the condition that the target ignition timings of the other cylinders are limited in the advancing direction of the angle by the limited timing, these timings are varied by the predetermined value α in the advancing direction of the angle (step S32). In this case, determination of lean malfunction is held in abeyance. Then, the integrated value $\Sigma\Delta T30$ is reset to "0" (step S29), and the procedure ends. In this case, since the determination end flag is not turned on, the integrated value $\Sigma\Delta T30$ of the rotational fluctuation $\Delta T30$ and the $\Sigma\Delta T30$/reference value are calculated later again.

If the correction(s) of the target ignition timings in the advancing direction of angle of the other cylinders are repeated and the target ignition timings have reached the limit timing (step S25: YES), occurrence of lean malfunction is determined based on the comparison between the re-calculated value of the $\Sigma\Delta T30$/reference value (step S24 in FIG. 5) and the first determination value J1.

If the value of the $\Sigma\Delta T30$/reference value is equal to or greater than the first determination value J1 (step S33: YES in FIG. 6), in the Determination mode I, the presence of a lean malfunction is determined (step S27). Then, the determination end flag is turned on (step S28), the integrated value $\Sigma\Delta T30$ is reset to "0" (step S29), and the procedure ends.

Meanwhile, if the value of the $\Sigma\Delta T30$/reference value is smaller than the first determination value J1 (step S33: NO), in the Determination mode IV, absence of lean malfunction is determined (step S34). Again, in this case, the determination end flag is turned on (step S28), the integrated value $\Sigma\Delta T30$ is reset to "0" (step S29), and the procedure ends.

As explained above, the present embodiment has the following advantages.

(1) When the value of the $\Sigma\Delta T30$/reference value is equal to or greater than the first determination value J1, assuming that the integrated value $\Sigma\Delta T30$ is large enough to predict the presence of lean malfunction with high possibility, it can be determined that the lean malfunction occurs. On the other hand, if the value of the $\Sigma\Delta T30$/reference value is equal to or smaller than the second determination value J2, assuming that the integrated value $\Sigma\Delta T30$ is small enough to predict the absence of lean malfunction with high possibility, it can be determined that the lean malfunction does not occur. Meanwhile, if the value of the $\Sigma\Delta T30$/reference value is smaller than the first determination value J1 and greater than the second determination value J2, assuming that the integrated value $\Sigma\Delta T30$ is not so great but not so small, the mode of the ignition timing control can be changed so that the range the integrated value $\Sigma\Delta T30$ can take becomes greater. Then, the re-calculation of the integrated value $\Sigma\Delta T30$ and the determination based on the re-calculated integrated value $\Sigma\Delta T30$ can be performed. Thus, occurrence of lean malfunction can be determined based on the integrated value $\Sigma\Delta T30$ of the rotational fluctuation $\Delta T30$ that changes in a relatively broad range, and the determination can be performed with high accuracy.

(2) In determining occurrence of lean malfunction, when the value of $\Sigma\Delta T30$/reference value is smaller than the first determination value J1 and greater than the second determination value J2, the mode of the ignition timing control is changed so that only the torques generated in the other cylinders are changed. Since this change enlarges the difference between the torque generated in the given cylinder and the torques generated in the other cylinders, the determination of occurrence of lean malfunction can be performed based on this difference with high accuracy.

(3) During the idle operation where the acceptable range of variation in the air-fuel ratio is for operation of the engine is quite narrow, the determination of occurrence of lean malfunction can be performed with high accuracy.

(4) By changing the ignition timings of the other cylinders in the advancing direction of angle while maintaining the torque of the given cylinder by remaining the target ignition timing unchanged, the difference between the torque generated in the given cylinder and each of torques generated in the other cylinders can be made greater.

(5) By setting MBT as the limit timing for changing the target ignition timing, the ignition timing can be changed in the scope where the generated torque can be increased.

(6) When the value $\Sigma\Delta T30$/reference value, which is calculated on the condition that the target ignition timings of the other cylinders become MBT through the change in the ignition timing control, becomes less than the first determination value J1, it is determined that a lean malfunction has not occurred. Thus, even if the ignition timing is changed to increase the rotational fluctuation $\Delta T30$, the value of $\Sigma\Delta T30$/reference value does not become equal to the first determination value J1 or greater even after the target ignition timings of the other cylinders have reached MBT. In this case, it is determined that the rotational fluctuation $\Delta T30$ is small. Thus, absence of lean malfunction can be determined based on such determination with high accuracy.

The above embodiment may be modified as follows.

Instead of the value of the $\Sigma\Delta T30$/reference value, the $\Delta T30$/reference value, which is the value where the rotational fluctuation $\Delta T30$ is divided by the reference value or an average value/reference value, which is the value where an average value of the predetermined rotational fluctuations $\Delta T30$ in a predetermined period (for example, a period for which the output shaft 19 rotates by the predetermined time) is divided by the reference value may be calculated. Also in these configurations, by calculating a value corresponding to the rotational fluctuation $\Delta T30$ or the average of the rotational fluctuations $\Delta T30$ as the reference value, the same operations and advantages as in the above embodiment can be achieved.

Instead of determining the occurrence of a lean malfunction one time per trip, the determination may be performed a plurality of times in one trip by, for example, by performing the determination based on the integrated value $\Sigma\Delta 30$ each time the integration of the rotational fluctuation $\Delta T30$ is performed by the amount the output shaft 19 rotates by the predetermined number.

The reference value, the first determination value J1, and the second determination value J2 may be varied, as long as it can be appropriately determined that the rotational fluctuation $\Delta T30$ is great enough to reliably determine the presence of a lean malfunction in the given cylinder and the degree of rotational fluctuation is small enough to reliably determine the absence of a lean malfunction in the given cylinder.

If the variation width of the rotational fluctuations $\Delta T30$ caused by the difference in the engine load or the engine rotational speed during idle operation of the engine 11 is small, instead of using the $\Sigma\Delta 30$/reference value as a degree of rotational fluctuation, the integrated value $\Sigma\Delta 30$ of the rotational fluctuation $\Delta T30$ may be used. Also in this configuration, by setting the value corresponding to the integrated value $\Sigma\Delta 30$ of the rotational fluctuation $\Delta 30$ as the first determination value J1 and the second determination value J2 in advance, the same operations and advantages as in the above embodiment can be achieved.

Instead of using the $\Sigma\Delta 30$/reference value as a degree of rotational fluctuation, not only in using the integrated value $\Sigma\Delta T30$ of the rotational fluctuation $\Delta T30$ but also the first determination value J1 and the second determination value J2 may be set based on the engine load and the engine rotational speed. In this case, the first determination value J1 and the second determination value J2 are set greater as the engine load is greater and the engine rotational speed is lower.

Calculation of the time period T30 may be modified so long as the value indicative of the rotational speed of the output shaft 19 in the combustion stroke can be calculated. The amount of the rotational angle to be calculated may be changed, for example, by setting the top dead center as the reference for "0° CA" and calculating the time period required for the output shaft 19 to rotate from 10° CA to 40° CA. Alternatively, the time for the rotational angle to be calculated may be changed by setting the compression top dead center as the reference for "0° CA" and calculating the time period required for rotating from 0° CA to 40° CA.

As the rotational fluctuation $\Delta T30$, not only the difference in the time period T30 between the two cylinders 12 whose ignitions are successive, the difference between the time period T30 of the given cylinder and the time period T30 of either of the other cylinders may be calculated.

The limit timing for the target ignition timing may be varied as long as it is set on the retarding side of angle compared to the MBT.

The limit timing may not be set. In this case, the advancement of the target ignition timings in the other cylinders and determination based on the integrated value $\Sigma\Delta T30$ of the rotational fluctuation $\Delta T30$ are performed by the limited number (for example, only one time) to prevent the target ignition timings from reaching the MBT even when the target ignition timings are varied.

In accordance with the change of the target ignition timings in the other cylinders by the predetermined value $\alpha$ in the advancing direction of the angle, the target ignition timing of the given cylinder may be also changed by a small amount (a little smaller than the predetermined value $\alpha$) in the advancing direction of the angle.

In accordance with the change of the target ignition timings of the other cylinders, the first determination value J1 and the second determination value J2 may be changed to some extent.

Instead of changing the target ignition timings for the other cylinder(s) in the advancing direction of the angle, the fuel injection amount for the other cylinder(s) may be increased by a predetermined amount or valve timing for the engine valve for the other cylinder(s) may be changed by a predetermined amount. That is, the mode of engine control such as the control for adjusting the amount of intake air or the fuel injection control may be changed so that the difference between the torque generated in the given cylinder and the torque generated in the other cylinder(s) becomes greater, so that the control for the given cylinder and that for the other cylinder are different, and so that the torques therefore are increased.

The determination of occurrence of lean malfunction may be performed in the time period other than during the idle operation as long as the internal combustion engine 11 operates in lean combustion.

The malfunction determination apparatus of the above embodiments may be applied not only to an apparatus for determining occurrence of lean malfunction but also to an apparatus for determining the occurrence of a malfunction of air-fuel ratio where the air-fuel ratio of the given cylinder becomes overly rich (rich malfunction) by modifying its configuration appropriately. In this case, for example, the target ignition timing of the given cylinder is corrected by a predetermined amount in the advancing direction of the angle while the target ignition timing of the other cylinder(s) remains unchanged when the integrated value $\Sigma\Delta T30$ is smaller than the first determination value but greater than the second determination value. Then, the mode for the ignition timing control may be changed so that the difference between the torque generated in the given cylinder and the torque generated in the other cylinder(s) becomes greater, so that the control for the given cylinder and that for the other cylinder are different, and so that the torques are increased.

Not only a four cylinder internal combustion engine is applicable, and the malfunction determination apparatus of the invention may be applied to a multicylinder internal combustion engine having two or more cylinders.

The invention claimed is:

1. A diagnostic method for a multicylinder internal combustion engine for detecting a rotational fluctuation between cylinders during lean-burn operation of the engine and determining an occurrence of a malfunction pertaining to air-fuel ratio in a given cylinder based on the detected rotational fluctuation, the method comprising:
    determining that the malfunction pertaining to the air-fuel ratio has occurred when a degree of the rotational fluctuation is equal to or more than a first determination value;
    determining that the malfunction pertaining to the air-fuel ratio has not occurred when the degree of the rotational fluctuation is equal to or less than a second determination value that is smaller than the first determination value; and
    changing a mode of engine control to increase the degree of the rotational fluctuation when the degree of the rotational fluctuation is smaller than the first determination value and greater than the second determination value, so that:
    a difference between a torque generated in the given cylinder and a torque generated in another cylinder becomes greater,
    a control for the given cylinder and that for the another cylinder are different, and
    the torques are increased,
    wherein, after changing the mode of engine control, determining if the malfunction pertaining to the air-fuel ratio has occurred based on the increased degree of the rotational fluctuation.

2. The diagnostic method according to claim 1, wherein the malfunction pertaining to the air-fuel ratio is a malfunction where the air-fuel ratio for the given cylinder becomes overly lean, wherein changing the mode of engine control is for the another cylinder only so that the control for the given cylinder and that for the another cylinder are different.

3. The diagnostic method according to claim 2, wherein the determining that the malfunction pertaining to the air-fuel ratio has occurred comprises determining occurrence of the malfunction pertaining to the air-fuel ratio on a condition that the internal combustion engine is in an idle operation state.

4. The diagnostic method according to claim 2, wherein changing the mode of engine control comprises changing an ignition timing of the another cylinder in an advancing direction of angle without changing the ignition timing of the given cylinder to change the mode of engine control so that the control for the given cylinder and that for the another cylinder are different.

5. The diagnostic method according to claim 4, wherein a minimum advance for best torque is set as a limit timing for a change of the ignition timing, wherein the minimum advance for best torque is the ignition timing where the total torque generated becomes maximum in an engine control region.

6. The diagnostic method according to claim 5, wherein if the degree of the rotational fluctuation detected in the state where the ignition timing of the another cylinder becomes the minimum advance for best torque through the change of the ignition timing becomes less than the first determination value, it is determined that the malfunction pertaining to the air-fuel ratio has not occurred.

7. The diagnostic method according to claim 1, further comprising
    detecting a rotational speed of an output shaft of the engine for each cylinder at a predetermined rotational angular range in a combustion stroke, and
    calculating a difference of the detected rotational speed of the given cylinder and that of the another cylinder to derive the rotational fluctuation.

8. The diagnostic method according to claim 1, wherein the degree of rotational fluctuation is a value of an integrated value of the rotational fluctuation between the cylinders during lean-burn operation divided by a reference value, wherein the reference value is an integrated value calculated in an engine operation region defined by an engine load and an engine rotational speed, wherein the reference value is set so great as to reliably determine the occurrence of lean malfunction in the engine operation region.

9. A diagnostic system for a multicylinder internal combustion engine for detecting a rotational fluctuation between cylinders during lean-burn operation of the engine and determining an occurrence of a malfunction pertaining to an air-fuel ratio in a given cylinder based on the detected rotational fluctuation, the diagnostic system comprising:
    an electronic control unit including a CPU and a memory having stored therein procedure steps executed by the CPU, the steps comprising:
    when a degree of the rotational fluctuation is equal to or more than a first determination value, determining that the malfunction pertaining to the air-fuel ratio has occurred;
    when the degree of the rotational fluctuation is equal to or less than a second determination value that is smaller than the first determination value, determining that the malfunction pertaining to the air-fuel ratio has not occurred; and
    when the degree of the rotational fluctuation is smaller than the first determination value and greater than the second determination value, changing a mode of engine control to increase the degree of the rotational fluctuation so that:

a difference between a torque generated in the given cylinder and a torque generated in an another cylinder becomes greater, a control for the given cylinder and that for the another cylinder are different, and the torques are increased, wherein, after changing the mode of engine control, determining if the malfunction pertaining to the air-fuel ratio has occurred based on the increased degree of the rotational fluctuation.

10. The diagnostic method according to claim 1, wherein the first determination value and the second determination value are both positive and constant.

11. The diagnostic system according to claim 9, wherein the first determination value and the second determination value are both positive and constant.

* * * * *